United States Patent Office 2,917,967
Patented Dec. 22, 1959

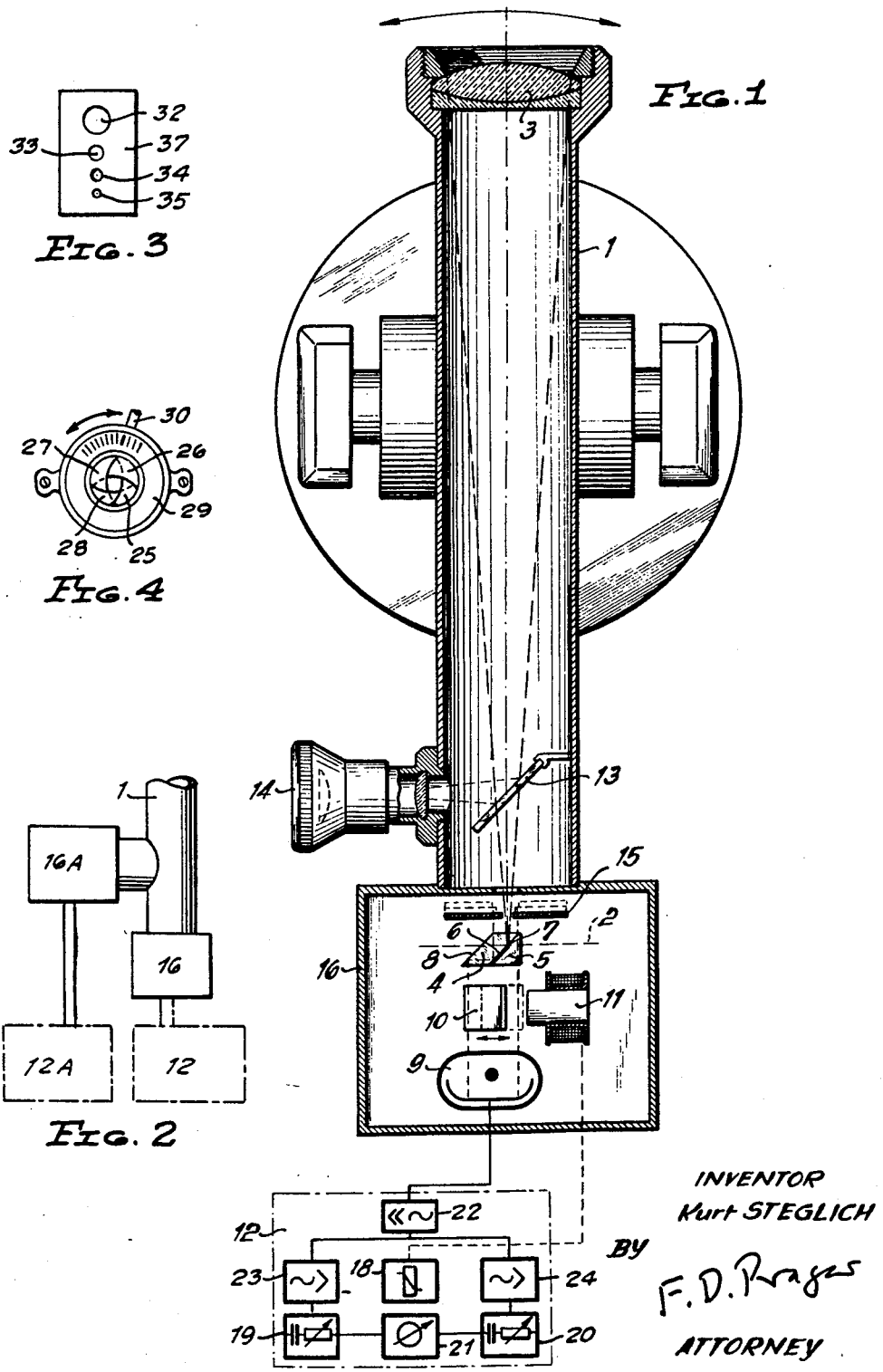

2,917,967

PHOTOELECTRIC DEVICE, MAINLY FOR GEO-DETICAL AND ASTRONOMICAL INSTRUMENTS

Kurt Steglich, Berlin-Spandau, Germany, assignor to Askania-Werke A.G., a corporation of Germany Application October 1, 1956, Serial No. 613,283

Claims priority, application Germany October 1, 1955

2 Claims. (Cl. 88—1)

This invention relates to a device for objectively determining, in geodetical and astronomical instruments and the like, the precise position of a light emitting or light reflecting target such as a star, a transit target or the like. The device may for instance replace the subjective observations which can be made by a human eye and may provide instead an electric eye or photoelectric device in order to enhance the precision of locating or tracking the target; however, the device is improved, according to one aspect of the invention, with regard to the facility and accuracy of making observations of the same target, at the same time or successively, by the human eye as well as the electric eye. According to another aspect of the invention the device is improved with regard to observations made on the same target by a plurality of electric eyes. The improvement has been provided by a new arrangement of a well-known optical element of spectrally selective reflectance and transmissivity, which replaces a device wherein a total reflector is mechanically operated. Details will be clear from the complete description, which follows.

In the drawing, Figure 1 is a schematic, central section, in plan view, of an embodiment of the invention. Figure 2 is a fragmentary plan view of a modified embodiment. Figures 3 and 4 are fragmentary views of a first and a second modification, respectively, of a detail shown in Figure 1, these views being taken along a line transverse to the plane of Figure 1.

Figure 1 shows the tube 1 of the sighting telescope of a theodolite, for instance for first order triangulation. It may be assumed that the theodolite shall be focussed on a socalled target "point" of luminous character with precision centering of the "point" image in the image plane of the instrument, for which purpose the telescope can be adjusted in a horizontal plane by small adjustments in either of the directions of the arrows. The target itself is not shown, nor is it believed to be necessary to show the precision adjustment mechanism, the invention being concerned with the determination of required adjustments, not with the means for making them.

In the case of purely human observation subjective errors of adjustment are caused by the scintillation of the target image, which scintillation is caused by the unavoidable movement of air masses, in all geodetical or similar observations; and the magnitude of such scintillation and of the errors caused thereby is significant in case of precision or high precision work. According to one feature of the invention, an electric eye can be arranged so as to be free of such error; and such electric eye can be provided with sufficient sensitivity to perform observations which are beyond the capacity of the human eye, as to spectral composition, intensity etc.

In the image plane 2 of the telescope objective 3 there is arranged a stationary optical element 4, 5 for splitting the target image into two laterally juxtaposed halves. The preferred image splitter comprises, in accordance with the applicant's copending application S. N. 536,912 filed September 27, 1955, now abandoned, a rhombic prism 4 and a forty-five degree prism 5 cemented thereto; the hypotenuse surface of prism 5 being in contact with one side surface of the rhombic prism 4 and one part of this side surface having thereon a reflector coating 6 which has a sharply defined edge 7, separating it from the non-mirrorized part of this side surface. The edge 7 lies exactly in the center of the image plane 2 constituting the sight of objective 3; in the drawing it may be visualized as a straight line normal to the plane of the paper. Thus the light from one half of the target area passes through the beam splitter without deflection, while that from the other half is reflected by coating 6; and this is further reflected by the opposite side surface 8 of the rhombic prism, so that in effect, the image splitter furnishes two separate, parallel beams belonging respectively to the two halves of the target area. It is assumed that the target area normally has homogeneous luminance; this is usually the case in extraterrestrial targets and can be enforced, if necessary, in terrestrial targets.

As further shown in said prior application the two separated light beams are received in a single light-sensitive receiver or photocell. This receiver may for instance consist in an electron multiplier 9, the several electrodes of which lie below the single, curved electrode which is shown; this representation of course being used for purely diagrammatic purposes. (It may be well to remember at this point that the metallic layers used in such devices are filled with electrons, some of which are emitted by photon or photoelectron impact if the layer can be penetrated by photons or photoelectrons, which it can if the atom structure of the metallic layer is suitable as for instance in the case of potassium and caesium oxide and if, in addition, the wave length of the received light is small enough to provide the so called threshold frequency. In the photocells used in normal practice the threshold frequencies lie in the ultraviolet region of the spectrum or in the so-called blue color band or generally: outside a major portion, such as the green and red band, of the visible spectrum; the green and red color bands have little effect, by comparison. These facts are well known but have not, thus far, been considered in connection with instruments of the present type.)

The receiver 9 alternately receives one and the other partial light beam, by virtue of suitable means, for instance a swinging shutter 10 actuated by electromagnet 11 to alternately cut off the two partial beams. The photocell output currents produced by the two separate and alternating beams are compared with one another by a symmetrical subassembly 12, which may be identical with the subassembly 15 to 21 of said prior application. There is therefore shown the same electronic switch 18, time constant members 19, 20 and galvanometer 21 as in said prior application; the members 19, 20 being associated with an amplifier 22 of the voltages generated in cell 9, through a pair of electron tubes 23, 24. By means of the cooperation of said electronic switch, time constant members, amplifier and electron tubes, which cooperation is known per se, the galvanometer 21 furnishes the differential photometric analysis of the target image.

It furnishes this analysis only in one plane, normal to the beam splitter edge 7; in the present example it compares luminosities of laterally juxtaposed halves of the target image, as influenced by scintillation, thereby providing the required data for adjustment in azimuth. In order to adjust the telescope 1 in the second coordinate, here in altitude, visual means may be used. Such means have thus far been provided by means comprising a deflector mirror insertable in the ray trace of the objective 3 ahead of the beam splitter 4, 5; and such an interceptor has usually been combined with an ocular 14 including a suitable marker plate, thereby providing an optical system, additional to the receiver system 9, 12, for observing the target in a way independent of and additional to the observation by said receiver system.

The mechanical insertion of the interceptor mirror has been one of the remaining drawbacks of instruments of this type. The mechanical requirements to be fulfilled by the inserting mechanism are extremely high if precise coordination of the beam splitter edge 7 with the corresponding mark on the ocular marker plate shall be preserved. A substantially rigidly inserted deflector is required at this point, in order to insure full precision.

Ordinarily, when a deflector is rigidly inserted in a similar position, where light transmission is also required, there arises the question whether the sacrifice of intensity of reflected or transmitted light is not too great. According to the present invention, however, such sacrifice or loss of light has been minimized. This follows from a further consideration of the aforementioned threshold frequencies of the photoelectric means; a consideration which leads to the use of an interference partial reflector 13 or color selective mirror, rigidly inserted in the ray trace.

Thus an ultraviolet threshold multiplier 9 allows practically full utilization of visible frequencies in the ocular, while a blue threshold multiplier allows full utilization of the red and green band in the ocular. Other examples could obviously be formulated.

It will now be understood that the invention is not limited to the practical application as described and illustrated up to this point. The deflector mounting may be non-rigid, in cases where it is both possible and worth while to provide sufficient accuracy of insertion, mechanically; the resulting arrangement is still benefited by the advantage of the particular light frequency distribution, as indicated above, whenever optical observations are required simultaneously with the photoelectrical observation.

According to another modification the interference mirror or partial reflector element 13 may be rigidly mounted but may be combined, not with an ocular but with a device located and oriented like the ocular 14 but constructed like the unit 16, 12 constituting the above-described photo-analyzer; this second unit 16A, 12A (Figure 2) being used for automatic altitude adjustment when the first unit 16, 12 is used for azimuth adjustment as mentioned. The two photo-tubes 9 will then be selected to provide different frequency thresholds and the interference mirror 13 will be constructed to transmit and reflect different frequencies in accordance with this selection.

A further refinement of the device relates to the elimination of light other than that from the target, in the photosensitive tube, for instance the elimination of light from bright stars adjacent the star to be focussed on. Such added light would actuate the tube and cause errors in the analysis required. In order to eliminate it to the greatest possible extent in spite of diffraction phenomena, means are provided for stopping, coaxially with the target image, outer parts of the bundle of imaging rays, between the objective 3 and the beam splitter 4, 5 but directly adjacent the latter. Preferred examples of such means are furnished by an adjustable iris diaphragm (Figure 4) or a similarly arranged multiple diaphragm (Figure 3) with openings of different diameter. Because of the inclined arrangement of the beam splitter surface carrying the edge 7 and because of the presence of glass of prisms 4 and 5 in front of this edge, the diaphragm cannot be placed in the plane of the image itself; however it has been found sufficient, for the purposes stated, to place this diaphragm directly in front of these prisms, so that it forms an aperture control member for the objective 3.

The adjustable iris diaphragm or multiple diaphragm may be conventional by itself. For instance Figure 4 shows the iris diaphragm as comprising the usual series of swingable vanes 25, 26, 27, 28, which may be pivoted in the usual housing 29 and may be adjusted conjointly, by the usual mechanism, not shown, under the control of an adjustment lever 30. Similarly Figure 3 shows a multiple diaphragm plate 31 having a series of apertures 32, 33, 34, 35 formed therein and which plate can be shifted across the axis of the instrument in well known ways, with the aid of guiding and manipulating parts, not shown.

I claim:

1. In a telescope for observing and tracking a luminous object without disturbance by scintillation and with minimum loss of light: an objective; a first and a second optical system, both adapted to receive light from the object through the objective; a color selective partial reflector stationarily mounted between the objective on the one hand and the two optical systems on the other hand, with a partial reflector surface inclined to the optical axis of the objective, for selectively passing light of frequencies in one major portion of the visible and ultraviolet spectrum to the first optical system for said observing, while passing light of other frequencies of the spectrum to the second optical system; and, for said tracking and as part of at least one of said optical systems, a photometric analyzer, having threshold sensitivity for light frequencies in the respective portion of the spectrum, a stationary image splitter between the partial reflector and the analyzer, with an image splitting edge intersecting the optical axis of the objective, and shutter means between the image splitter and the analyzer for alternately shutting off image portions split by the image splitter.

2. In a telescope as described in claim 1 the feature that the partial reflector selectively reflects at least the red and green band while selectively transmitting at least the ultraviolet band.

References Cited in the file of this patent

UNITED STATES PATENTS

| 1,322,780 | French | Nov. 25, 1919 |
| 1,470,770 | Siedentopf | Oct. 16, 1923 |
| 2,302,554 | Kingsbury | Nov. 17, 1942 |
| 2,462,925 | Varian | Mar. 1, 1949 |
| 2,513,367 | Scott | July 4, 1950 |

FOREIGN PATENTS

| 352,035 | Great Britain | June 22, 1931 |

OTHER REFERENCES

Whitford et al.: "Photoelectric Guiding of Astronomical Telescopes," Review of Scientific Instruments, vol 8, pages 78–82, March, 1937.